INVENTOR.
J. NORMAN WRIGHT

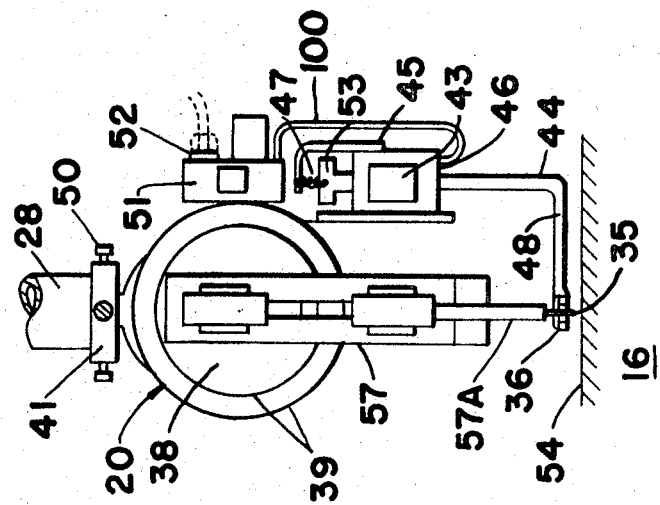
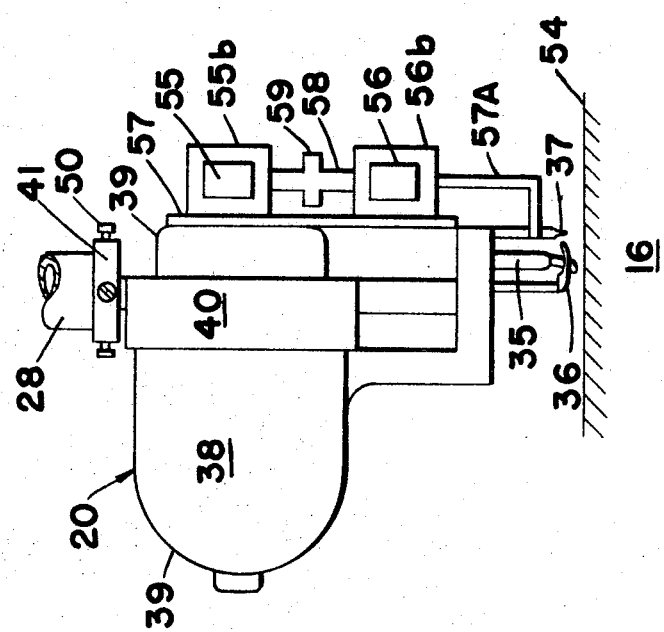

United States Patent Office 3,470,780
Patented Oct. 7, 1969

3,470,780
REMOTELY CONTROLLED CUTTING KNIFE
J. Norman Wright, Baltimore, Md., assignor to J. Schoeneman, Incorporated, Owings Mills, Md., a corporation of Delaware
Filed Apr. 4, 1966, Ser. No. 539,880
Int. Cl. B26d 7/02, 5/42
U.S. Cl. 83—375                                   2 Claims

ABSTRACT OF THE DISCLOSURE

In a cutter for cutting multiple cloth layers the improvement consisting of a plate which moves up and down in front of the cutting blade as the cutter advances. The purpose of the plate is to assist in making a clean, even cut through all the layers of cloth.

---

The present invention relates generally to cloth cutting and more particularly to the remotely controlled cutting of multiple cloth layers.

The object of this invention is to provide an improved apparatus for simultaneously remotely controlled cutting of a plurality of cloth layers which have been laid one atop the other by cloth spreading means.

In accordance with one aspect of this invention, the foregoing object and other objects of this invention are achieved by a remotely controlled cutting knife which includes a motivated plate positioned so that it cooperates with a cutting blade to keep the various mineral layers from slipping and sliding during the cutting operation.

The invention comprises the features hereinafter described and particularly set out in the claims, the description setting forth certain illustrative embodiments of the invention. These embodiments show some of the many ways in which the principles of this invention may be employed.

One feature of the present invention is that the improved cutting knife overcomes the effects of vibration which make a clean, even cut through all the plies difficult to achieve. The invention overcomes these effects by supporting the cloth layers between the cutting table and a patter plate as the knife progresses and provides beneficial results for many reasons, for example, little or no allowance need be made for displacement of the various plies of cloth in relation to each other which might otherwise occur.

For the purposes of this specification, cloth will be used as a term designating textiles, non-wovens, plastics and the like which are commonly used in the making of garments and coverings.

For a more complete understanding of the invention reference should be made to the drawings wherein:

FIGURE 4 is a front view of a cutting knife constructed in accordance with the principles of this invention; and FIGURE 5 is a side view of the knife of FIGURE 4.

The drawings are to be understood to be more or less of a diagrammatic character for the purposes of illustration. Like characters identify the various elements in the several views.

The foregoing and other aspects of this invention will be discussed more fully in the following paragraphs wherein specific examples of the application of the invention will be described.

Figure 1:
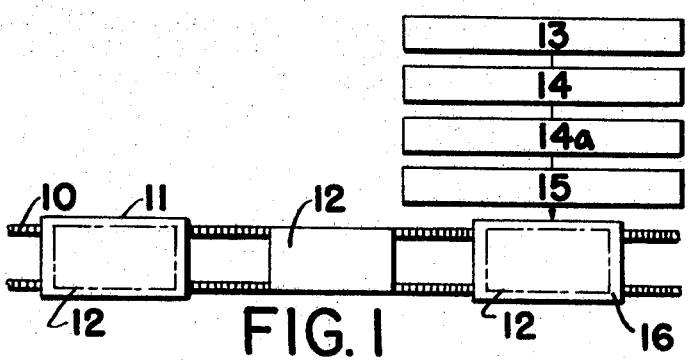
FIGURE 1 is a schematic representation of a remote cutting system.

The cloth cutting, according to this invention, is accomplished in a remotely controlled knife system comprising several basic elements working in concomitant fashion. These are shown in FIGURE 1 and include conveying means 10, a cloth spreader 11, cutting table 12, pattern selector 13, lay-up 14, memory 14a, driving mechanism 15, and cutting machine 16. This figure shows one example of an automated cloth cutting system in conjunction with which the cutting knife of this invention could be employed. The cutting table 12 is moved by means of the conveying means 10 to a position underneath a spreader 11. The conveyor might typically consist of rails which guide the movement of the table and a rack which engages a driven gear attached to and located beneath the cutting table top. Many types of conveyor systems are known, any of which might be suitably employed. The cutting table is sturdily built and typically has a hard, firm wooden or composition top. The spreader drops the cloth onto the table top. Spreading may be done by hand, but devices are available which spread multiple layers and which allow reversal of the lay such that each ply has the proper side facing up.

The desired cut which is to be made by the cutting machine is determined by the location of particular preselected individual patterns or pieces comprising the lay-up 14. The pattern selection and lay-up may be accomplished in a known manner and do not form a part of this invention. They are depicted in the figure for purposes of clarity. A memory system 14a, which might typically consist of numerical coordinates stored on a punched paper tape or of a photoelectric sensor which traces a path determined by a pattern of light, feeds a signal to a driving mechanism 15. The driving mechanism typically causes the cutting knife to trace the desired route through the plies of cloth thereby making the cut.

Figure 3:
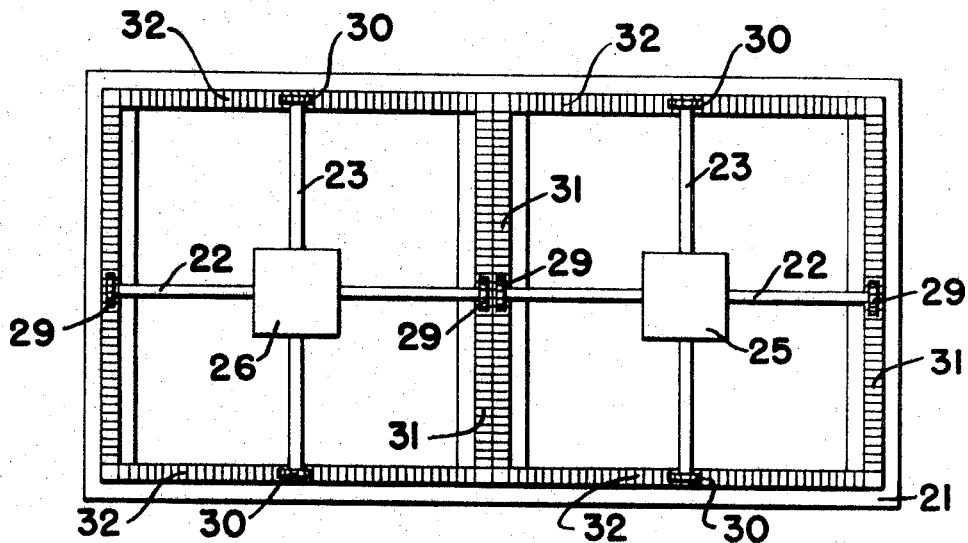
FIGURE 3 is a plan view of the cutting machine of FIGURE 2.
Figure 2:
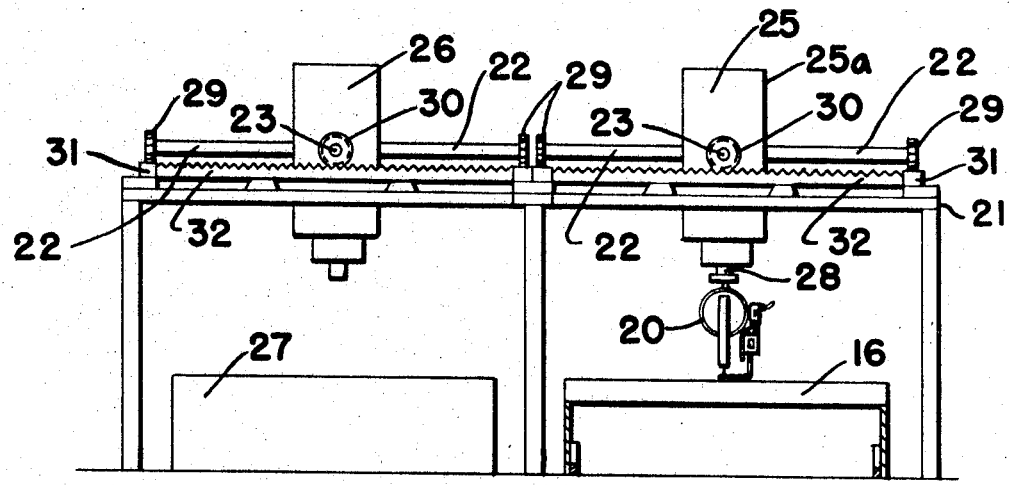
FIGURE 2 is an elevation view of a cutting machine.

FIGURES 2 and 3 show in schematic representation, an embodiment of a cutting machine including a remotely controlled cutting knife 20.

The cutting machine includes a frame designated generally as 21, which serves to support the cutting knife 20 at a point above the top of the cutting table 16. By means of the positioning of support members 22 and 23, the cutting knife can be moved about within the bounds of the frame 21. Since a typical lay-up is calculated to require a continuous cut, it is not necessary that the suspended cutting knife be moved up and down. However, three dimensional movement of the knife can be accomplished by known means if desired.

The cutting table is movable on conveyor means as previously noted. In a typical operation, a number of plies of cloth would be laid on the top of the cutting table 16 and the table would be then moved to a position beneath the cutting machine frame 21.

Referring to FIGURE 2, a driving mechanism is contained in housing 25a. The driving mechanism moves support members 22 and 23 to correspond with instructions relayed to it from a sensor 26. The sensor is electrically inter-connected with the cutter driving mechanism and includes a photo-electric element which causes it to trace in its movement along a pattern of light produced on a screen 27. This pattern is identical to the lay-up.

As members 22 and 23 move, so does their point of intersection which traces, in a plane parallel to the plane of the cutting table top, a line corresponding to the outlines of the component patterns which comprise the lay-up.

The remote cutting knife 20 is affixed to a swivel connection 28. The swivel connection is operatively connected to the support members 22 and 23 such that the cutting knife is always suspended at a point beneath the intersection of the supports. The supports 22 and 23 are driven by the rotation of gears 29 and 30 which engage racks 31 and 32 on the top of the frame. The racks lie in a plane substantially parallel to the plane of the cutting table surface.

FIGURES 4 and 5 show one embodiment of a cutting knife constructed in accordance with the principles of this invention. Briefly, the cutting is accomplished by a reciprocating cutting blade 35 which acts in conjunction with a patter plate 36. The plate moves up and down as the cutting knife advances. The movement of the plate serves to steady the cloth being cut (not shown) and successively compress portions of the cloth in the vicinity of the cutting blade on each downward stroke and prevents any appreciable slippage of the various plies as they are cut. A notching blade 37 is caused to notch the cloth at certain predetermined intervals. The cutting knife, designated generally as 20, includes an electric motor 38 carried in a housing 39. This housing is attached to frame 40 which includes a mounting ring 41. This mounting ring is the means by which the cutting knife is attached to the swivel shaft 28 (refer also to FIGURE 2).

Mounting ring 41 is approximately one-inch wide. Screws 50 are located radially around the periphery of the ring. The remote knife is secured to the shaft 28 by sliding the ring up around the shaft and tightening the screws. The swivel action of shaft 28 allows the cutting edge of the blade to face always in the direction of the cut.

In FIGURE 4, the motor 38 drives a long, narrow cutting blade 35 up and down. On one side of the motor housing 39, an electrically excited solenoid 43 is rigidly attached. A post 44 is disposed within the solenoid coil and when the coil is energized, post 44 is caused to move downward. An angle bar brace 45 is attached to the casing 46 of the solenoid coil so that it bends over and above one end of the post. A return spring 47 connects the post 44 and the bar 45. This spring causes the post to return from its downward position. A stroke is completed when the post is forced down by the solenoid and then returned by the potential energy stored in the return spring. An adjustable stop 53 controls the distance of travel of the post.

At the far end of post 44 is an arm 48 that extends away from the post at a right angle to a point in the vicinity of the cutting blade 35. Welded to the arm is a plate 36. This plate is relatively thin and slightly dished in one dimension. The plate is generally U-shaped and extends around three sides of the knife blade. The knife blade reciprocates within the confines of the plate.

A control panel box 51 is attached to the motor housing just above the brace 45. This panel includes a plug connection 52 which receives a plug carrying power from a source (not shown). From this panel box, electrical connections (not shown) bring power to the motor leads 100 and to the solenoid coil 43. The speed of the motor is controlled and in turn controls the reciprocating cutting blade. The patter plate is controlled by varying the frequency with which the solenoid coil 43 is excited.

The length of travel of the plate is regulated by the position of the adjustable stop 53. Typically, the plate travels about .125 to .281 inch. It has been found suitable to operate the plate at approximately 40–100 cycles per second during the cutting operation with the cutting knife travel being about 2 to 12 inches per second for a cut of 20 plies of cloth. The plate is, at all times, disposed about the cutting blade 35 which extends beneath the bottom surface of the plate. The bottom surface of the plate rests lightly against the top ply of the cloth (not shown) being cut when the plate is in its up position.

Referring now to FIGURE 5, the plate is shown to be generally at right angles to the surface 54 of the cutting table 16. It is believed that it will be equally suitable to position the plate at some oblique angle, tilting it either forward or backward. The plate shown is slightly curved or "dished." It has been found suitable to use a substantially flat plate, although it is believed that the curved shape is preferable, particularly at high speeds of advance of the remote cutter. The plate shown is approximately ⅞ inch wide and 1¼ inches long. The present inventor believes that where the back and fourth speed of the cutting blade is very slow, the plate should be substantially larger, and for example might be generally circular in shape and be four or more inches in diameter. Such a large plate might typically be substantially flat with a gentle upward curvature along its forward edge to prevent snagging or hanging-up in the cloth.

In FIGURE 5, two solenoid coils 55 and 56 are attached to the motor housing 39 at the front of the motor. A flat plate 57 is attached by screws to the motor housing. In turn, the coils are supported in individual casings 55b and 56b which are attached by screws to the plate. A rod 57a rides up and down within the solenoids, its length of travel being determined by an adjustable stop 59. The rod extends down through the lower solenoid 56 and carries at its lower end, a notching blade 37. When the respective solenoid coil is energized, the notching blade is driven into the fabric. The blade is forced up immediately thereafter by the energizing of the other coil. The notching blade serves to mark, for example, points where seams begin and end. The notches serve as a guide to the person assembling the finished item from the various individual pieces.

Although the present invention has been described with reference to specific apparatus, it will be appreciated by a person skilled in the art that a wide variety of changes may be made without departing from the scope of this invention.

I claim:

1. In a pattern cutter for remote controlled cutting of multiple cloth layers, including a body portion carryinng a motor and a movable cutting blade attached to the motor and operated thereby, said blade being so constructed and arranged as to move in continuous contact with the cloth as the cutter advances laterally through the cloth, the improvement comprising a motivating means attached to said body portion, a vertically movable plate disposed generally horizontally and at least partially about said cutting blade, said plate being so operatively attached to said motivating means so as to move up and down in a continuous cyclic motion during the cutting and said plate being so constructed and arranged that it exerts a pressure on said cloth layers on each downward stroke, whereby said plate assists in producing a sharp, even cut through all the cloth layers as the cutter advances.

2. The apparatus of claim 1 wherein the plate is adapted to cycle at approximately 40 to 100 cycles per second.

References Cited

UNITED STATES PATENTS

| | | | |
|---|---|---|---|
| 2,052,630 | 9/1936 | Hoskwith | 30—275 X |
| 1,172,058 | 2/1916 | Scheyer | 83—71 |
| 2,704,123 | 3/1955 | Williams | 83—620 X |
| 3,224,383 | 12/1965 | Adams et al. | 112—2 |

JAMES M. MEISTER, Primary Examiner

U.S. Cl. X.R.

83—453